US010809350B2

(12) United States Patent
Shu et al.

(10) Patent No.: US 10,809,350 B2
(45) Date of Patent: Oct. 20, 2020

(54) HYBRID FINGERPRINTING/OTDOA POSITIONING TECHNIQUES AND SYSTEMS

(71) Applicant: Telefonaktiebolaget LM Ericsson (publ), Stockholm (SE)

(72) Inventors: Di Shu, Shanghai (CN); Sara Modarres Razavi, Linköping (SE); Kunpeng Qi, Shanghai (CN); Arios Yu, Shanghai (CN); Ali Zaidi, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 242 days.

(21) Appl. No.: 15/999,058

(22) PCT Filed: Feb. 19, 2016

(86) PCT No.: PCT/CN2016/074092
§ 371 (c)(1),
(2) Date: Aug. 17, 2018

(87) PCT Pub. No.: WO2017/139961
PCT Pub. Date: Aug. 24, 2017

(65) Prior Publication Data
US 2020/0241106 A1     Jul. 30, 2020

(51) Int. Cl.
*H04W 64/00*     (2009.01)
*H04W 48/16*     (2009.01)
(Continued)

(52) U.S. Cl.
CPC .......... *G01S 5/0268* (2013.01); *G01S 5/0252* (2013.01); *H04W 64/00* (2013.01)

(58) Field of Classification Search
CPC ..... H04W 64/00; H04W 45/16; H04W 72/06; H04W 64/003
(Continued)

(56) References Cited

U.S. PATENT DOCUMENTS 8,903,415 B2 * 12/2014 Kazmi .................. H04W 64/00
                                                   455/443
9,581,679 B2 * 2/2017 Kazmi .................. G01S 5/0236
(Continued)

FOREIGN PATENT DOCUMENTS

CN       102065537 A     5/2011
CN       102118851 A     7/2011
(Continued)

OTHER PUBLICATIONS

Chinese Office Action dated Mar. 20, 2020 for Chinese Application No. 201680081995.6, 18 pages.
(Continued)

*Primary Examiner* — William D Cumming
(74) *Attorney, Agent, or Firm* — Sage Patent Group

(57) ABSTRACT

Methods and devices for performing hybrid fingerprinting/observed time difference of arrival (OTDOA) positioning are described. Fingerprinting information can be used to improve OTDOA results by using the fingerprinting information to generate OTDOA assistance information. The OTDOA assistance information is sent to a user equipment, which uses the OTDOA assistance information to perform reference signal time differences (RSTDs) measurements.

10 Claims, 9 Drawing Sheets

(51) Int. Cl.
*H04W 72/06* (2009.01)
*G01S 5/02* (2010.01)

(58) Field of Classification Search
USPC .................................. 455/443, 456.1, 456.5
See application file for complete search history.

(56) References Cited

U.S. PATENT DOCUMENTS

| | | | |
|---|---|---|---|
| 10,314,012 B2* | 6/2019 | Kumar | H04W 72/06 |
| 10,701,669 B2* | 6/2020 | Kumar | H04W 48/16 |
| 2010/0309057 A1 | 12/2010 | Edge et al. | |
| 2011/0077030 A1 | 3/2011 | Wigren et al. | |
| 2012/0184302 A1* | 7/2012 | Kazmi | H04W 64/00 455/456.5 |
| 2012/0314604 A1 | 12/2012 | Siomina et al. | |
| 2013/0017841 A1* | 1/2013 | Kazmi | G01S 5/0236 455/456.1 |
| 2013/0033999 A1 | 2/2013 | Siomina et al. | |
| 2015/0018010 A1 | 1/2015 | Fischer | |
| 2015/0141048 A1 | 5/2015 | Woo et al. | |
| 2019/0098601 A1* | 3/2019 | Kumar | H04W 48/16 |
| 2019/0274119 A1* | 9/2019 | Kumar | H04W 64/003 |

FOREIGN PATENT DOCUMENTS

| | | |
|---|---|---|
| CN | 102460203 A | 5/2012 |
| CN | 104853432 A | 8/2015 |

OTHER PUBLICATIONS

International Search Report and Written Opinion dated Nov. 10, 2016 issued in International Application No. PCT/CN2016/074092. (6 pages).

Extended European Search Report dated Jan. 9, 2019 issued in European Application No. 16890194.0. (10 pages).

* cited by examiner

HYBRID FINGERPRINTING/OTDOA POSITIONING TECHNIQUES AND SYSTEMS

CROSS REFERENCE TO RELATED APPLICATION(S)

This application is a 35 U.S.C. § 371 National Stage of International Patent Application No. PCT/CN2016/074092, filed Feb. 19, 2016, designating the United States.

TECHNICAL FIELD

Embodiments of the subject matter disclosed herein generally relate to methods and systems for determining a location of user equipment (i.e., positioning) in radio communication systems and, more particularly, to methods and systems for determining such location using a combination of fingerprinting positioning and observed time difference of arrival (OTDOA) positioning techniques.

BACKGROUND

Accurately determining the geographic position of a mobile user within a wireless communication network is an ongoing challenge in wireless telecommunications development. Government mandates, such as the E-911 positioning requirements in North America, and commercial Location Based Services (LBS) demand rapid and accurate position determination for user equipment (UE). Determining a location of user equipment is frequently referred to as "positioning". The accurate positioning of a UE becomes more challenging when considering indoor scenarios where, for example, Assisted GPS signals are less detectable.

Several position determination methods, of varying accuracy and complexity, are known in the art. These include cell ID positioning, Round Trip Timing (RTT) positioning, Observed Time Difference of Arrival (OTDOA) positioning, Assisted Global Positioning System (A-GPS) positioning, and fingerprinting positioning. Some of these positioning techniques will now be described in more detail.

For example, Assisted GPS (A-GPS) positioning is an enhancement of the global positioning system (GPS). Local GPS reference receiver networks/Global reference receiver networks collect assistance data from GPS satellites, such as ephemeris data. The assistance data, when transmitted to GPS receivers in UEs connected to the cellular communication system, enhance the performance of the UE GPS receivers. Typically, A-GPS accuracy can become as good as plus or minus ten meters without differential operation. However, this accuracy becomes worse in dense urban areas and indoors, where the sensitivity of the GPS receivers in UEs is most often not high enough for detection of the relatively weak signals which are transmitted from the GPS satellites.

Other positioning techniques instead rely on transmissions from the UEs and/or base stations to determine UE locations and, therefore, work better in areas where A-GPS techniques work poorly as those transmissions are typically stronger than signals transmitted from GPS satellites. For example, fingerprinting positioning technologies, also known as radio pattern matching (RPM) or radio signal positioning (RSP), represent a family of path-loss based technologies that rely on matching the radio frequency (RF) environment, as experienced by the UE, to the known, estimated or otherwise mapped characteristics of the larger RF system in which the UE is operating in order to generate position or location information for the UE. Information from the UE, including measurements of neighbor cell signal strengths, time delay and other network parameters, form the basis of the RF environment that is compared to the established system RF database to generate an estimate of the UE's position.

Thus, radio fingerprinting positioning methods are based on measurements made by the UE and the base station. One measurement set usable for radio fingerprinting is defined in 3GPP Technical Specification 25.215. Generally speaking, such fingerprinting positioning algorithms operate by creating a radio fingerprint for each point of a fine coordinate grid that overlays the radio access network (RAN). Each of the measurements associated with a radio fingerprinting positioning method can be associated with an identity of a radio base station (RBS), and possibly also one or more points of a coordinate grid. Fingerprinting positioning is typically considered to provide an accuracy somewhere in between that of high precision positioning methods, like A-GPS, and lower precision methods, like cell ID based positioning methods. A more detailed discussion of fingerprinting positioning techniques as they relate to the embodiments described herein is provided below.

The OTDOA positioning method relies on measurements, typically taken on pilot radio signals (or other reference signals) received by a UE which are transmitted from multiple eNodeBs. For example, to enable positioning in LTE radiocommunication systems, and facilitate positioning measurements of a proper quality and for a sufficient number of distinct locations, new physical signals dedicated for positioning (positioning reference signals, or PRS) have been introduced and low-interference positioning subframes have been specified in 3GPP. PRS are transmitted with a pre-defined periodicity of 160, 320, 640 and 1280 ms from one antenna port (R6) according to a pre-defined pattern as described, for example, in the standard specification 3GPP TS 36.211, Evolved Universal Terrestrial Radio Access (E-UTRA); Physical Channels and Modulation. A frequency shift, which is a function of a physical cell identity (PCI), can be applied to the specified PRS patterns to generate orthogonal patterns and modelling the effective frequency reuse of six, which makes it possible to significantly reduce neighbor cell interference on the measured PRS and thus improve positioning measurements. Since, for OTDOA positioning, PRS signals from multiple distinct locations need to be measured, the UE receiver may have to deal with PRS signals that are much weaker than those received from the serving cell.

More specifically, when employing OTDOA, the UE measures the timing differences of the downlink reference signals received from multiple distinct locations. For each (measured) neighbor cell, the UE measures a Reference Signal Time Difference (RSTD) which is the relative timing difference between the neighbor cell and the reference cell. The UE position estimate is then found as the intersection of hyperbolas corresponding to the measured RSTDs. At least three measurements from geographically dispersed base stations (BSs), e.g., eNodeBs, are needed to solve for two position coordinates of the UE and the receiver clock bias. In order to solve for the UE's position using OTDOA, precise knowledge of the transmitter (base station) locations and transmit timing offset is needed. OTDOA position calculations can be conducted, for example, by either a positioning server (Evolved Serving Mobile Location Center or E-SMLC in LTE) or the UE itself. The former approach is typically referred to as a "UE-assisted" positioning mode, while the latter is typically referred to as a "UE-based" positioning mode.

Furthermore, without the approximate knowledge of when the reference signals are expected to arrive at the UE and the exact PRS pattern, the UE would need to perform a signal search within a large window to perform OTDOA measurements, which would negatively impact the time and accuracy of the measurements as well as the UE complexity. Accordingly, to facilitate UE measurements for OTDOA, the network transmits assistance data to the UE, which typically includes, for example, a neighbor cell list containing physical cell identity (PCIs) of neighbor cells, the number of consecutive downlink subframes, PRS transmission bandwidth, downlink E-UTRA Absolute Radio Frequency Channel Number (EARFCN), etc. Reference cell and neighbor cells in the network can be selected for OTDOA measurements based on cell location and a cell propagation model. If the cell doesn't support PRS, RSTD can also be measured on cell-specific reference signals (CRS).

One of the main parameters which impacts the positioning accuracy when employing OTDOA is the accuracy in the RSTD measurements. Many parameters such as choice of reference cell, choice of neighbor cells, signal to interference/noise ratio (SINR), bandwidth, multipath, etc. can impact the amount of uncertainty in a UE's RSTD measurement. For example, conventionally the cell which is currently serving a UE is chosen as the reference cell and the UE measures the RSTD based on the serving cell as the reference cell. Although, the serving cell is the strongest cell for the UE, it is not always the best choice of reference cell for the UE in the context of performing OTDOA measurements. This is specifically an issue when considering indoor UEs which have more severe multipath issues than UEs which are operating outdoors and which also might have radio coverage from distant, outdoor macro cells. For example, when considering a cell with a relatively high TOA error as the reference cell, all the RSTD measurements will be negatively impacted by this choice, resulting in poor position estimation using the OTDOA positioning method.

Accordingly, it would be desirable to provide systems and methods that avoid the afore-described problems and drawbacks and which, more specifically, provide better assistance data for usage in OTDOA positioning.

SUMMARY

According to an embodiment, a method for assisting in performance of an observed time difference of arrival (OTDOA) positioning technique in a wireless communication system is described from the perspective of a network node. A location request for the user equipment is received and a command is transmitted to the user equipment to perform fingerprinting measurements. The fingerprinting measurements are received from the user equipment and information associated with the fingerprinting measurements are used by the network node to generate observed time difference of arrival (OTDOA) assistance information. The network node sends the OTDOA assistance information to the user equipment.

According to another embodiment, a network node is configured to assist in performance of an observed time difference of arrival (OTDOA) positioning technique in a wireless communication system: The network node includes an interface configured to receive a location request for the user equipment and a processor configured to transmit a command to the user equipment to perform fingerprinting measurements. The interface is further configured to receive the fingerprinting measurements from the user equipment and the processor is further configured to generate observed time difference of arrival (OTDOA) assistance information using one or more fingerprinting parameters associated with a fingerprint position of the user equipment. The interface is further configured to send the OTDOA assistance information to the user equipment.

According to another embodiment, a method for assisting in performance of an observed time difference of arrival (OTDOA) positioning technique in a wireless communication system is described from the perspective of a user equipment. The user equipment receives a command to perform fingerprinting measurements and transmits the fingerprinting measurements toward a positioning node. The user equipment receives observed time difference of arrival (OTDOA) assistance information which was generated using information associated with the fingerprinting measurements and measures reference signal time differences (RSTDs) using the OTDOA assistance information. The user equipment transmits at least one of the RSTDs and a position of the user equipment toward the positioning node in the wireless communication system.

According to another embodiment, a user equipment includes a processor configured to receive a command to perform fingerprinting measurements usable to generate the one or more fingerprinting parameters and a transceiver configured to transmit the fingerprinting measurements from the user equipment toward a positioning node. The transceiver is further configured to receive observed time difference of arrival (OTDOA) assistance information which was generated using information associated with the fingerprinting measurements and the processor is further configured to measure reference signal time differences (RSTDs) using the OTDOA assistance information. The transceiver is further configured to transmit at least one of the RSTDs and a position of the user equipment toward the positioning node in the wireless communication system.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
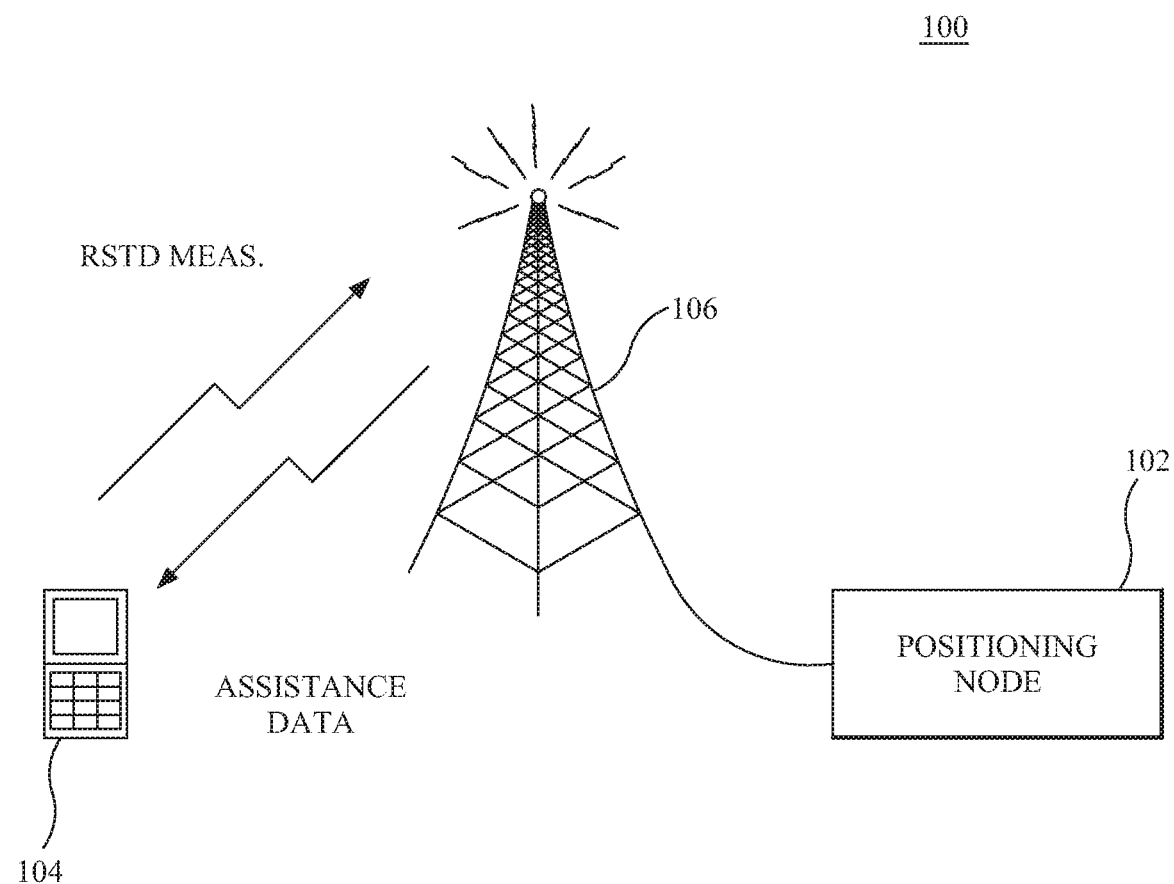
FIG. 1 depicts a conventional radiocommunication system performing an OTDOA positioning operation.

As mentioned above, when performing positioning for a UE using an OTDOA positioning technique in a radiocommunication system 100 as shown in FIG. 1, assistance data is sent from, e.g., a location server 102, to the UE 104 (via base station/eNodeB 106) to enable the UE 104 whose position is being determined to perform RSTD measurements. This assistance data can include, for example, the choice for reference cell, a neighbor cell list, a number of PRS subframes to measure, etc. By providing more accurate information to the UE 104 in the form of the assistance data, it is possible to assist the UE 104 in making more accurate RSTD measurements and thus, in turn, to obtain better positioning accuracy using an OTDOA positioning technique. Embodiments described herein achieve this by using fingerprinting positioning as a precursor to OTDOA positioning, wherein results from the fingerprinting positioning are used to generate the assistance data to be sent to the UE 104 for performing RSTD measurements as part of the OTDOA positioning process.

Figure 2A:
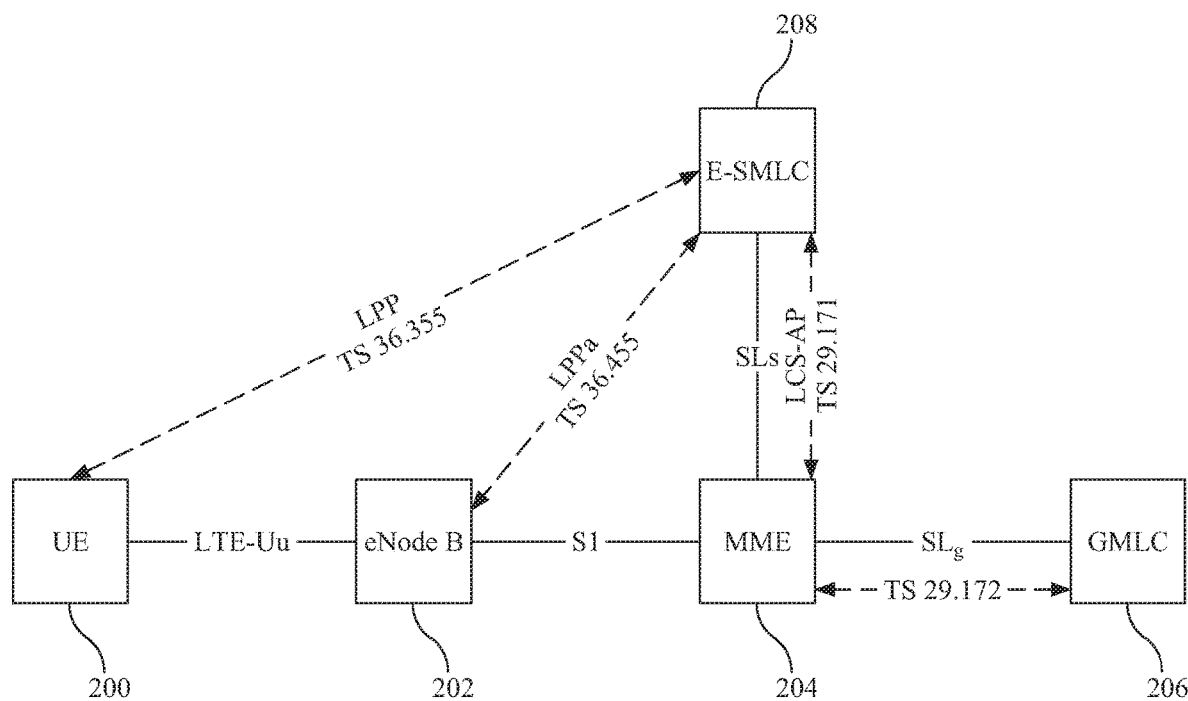
FIG. 2(a) shows an LTE positioning architecture.

An illustration of the architecture provided for positioning generally in an LTE radiocommunication system is shown in FIG. 2(a) including a plurality of nodes, and the interfaces (solid connecting lines) which are defined in the standardized 3GPP Technical Specifications (TS) for communications between the nodes. More specifically, it can be seen that a UE 200 is interfaced with its serving base station (eNodeB) 202 via the LTE-Uu interface which, in turn is interfaced with a Mobility Management Entity (MME) 204 via an S1 interface. The MME 204 interfaces with a Gateway Mobile Location Center (GMLC) 206 and a positioning node (Evolved Serving Mobile Location Center (E-SMLC)) 208 via an $SL_9$ interface and an $SL_S$ interface, respectively. The positioning protocols which detail, for example, how data is transferred between the entities for performing positioning is also shown in FIG. 2(a) by way of the dotted arrows and corresponding 3GPP standard citations. Those skilled in the art will appreciate that the present invention is not limited to application to LTE radiocommunication systems but can instead be applied to any such systems.

Figure 2B:
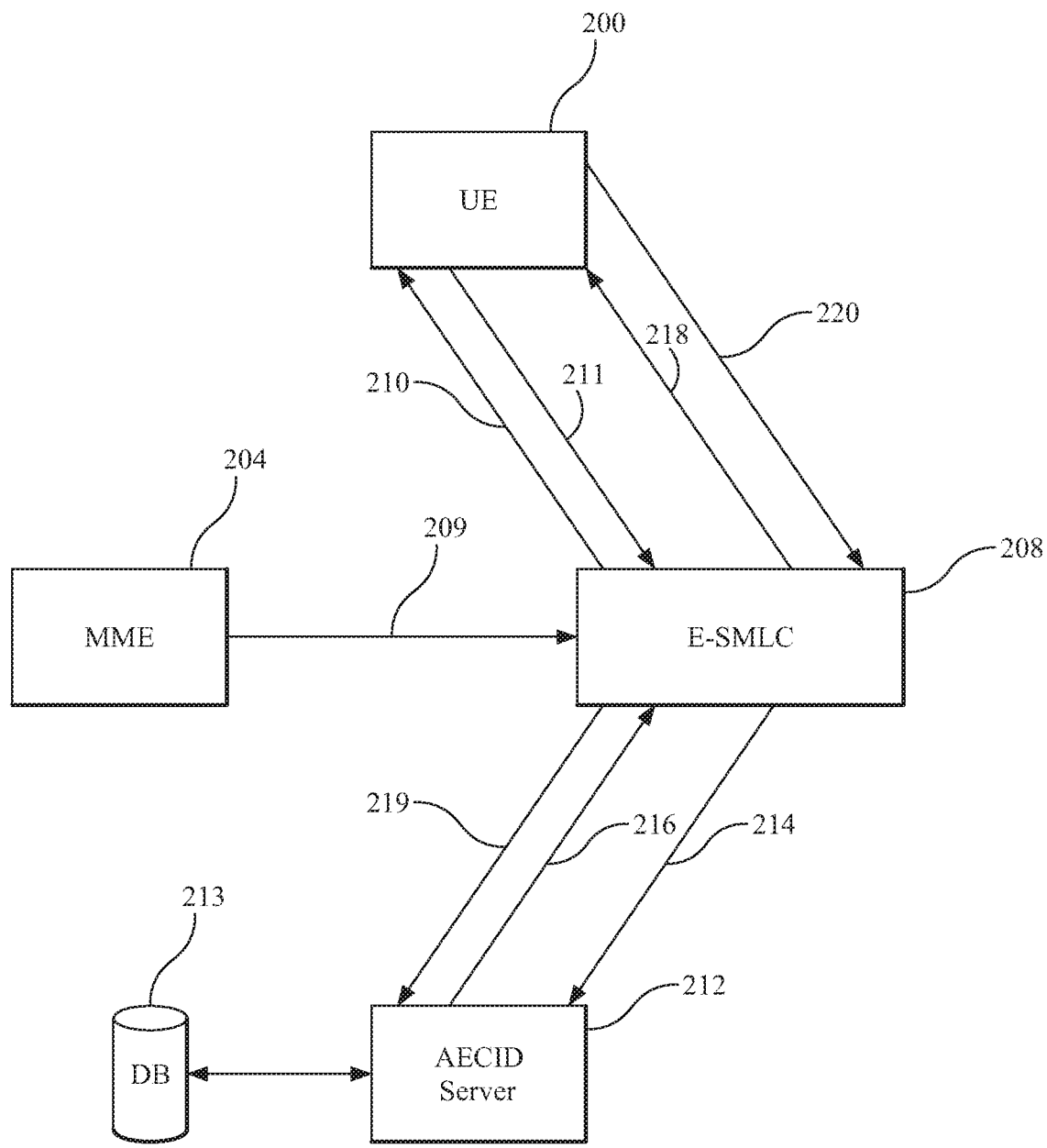
FIG. 2(b) shows signaling between nodes associated with a hybrid fingerprinting/OTDOA positioning technique according to an embodiment.

Hybrid fingerprinting/OTDOA positioning according to an embodiment can be implemented using the LTE positioning architecture of FIG. 2(a) as shown, for example, by the signaling diagram of FIG. 2(b). For example, when there is a need to obtain a current position of a UE 200 (e.g., when a location based service requests its position), the MME 204 will issue a location request signal 209 toward E-SLMC 208.

Upon receiving the location request signal 209, E-SMLC node 208 can send a signal 210 to the UE 200 requesting that the UE 200 perform measurements which establish its current, measured RF "fingerprint". Signal 210 can be promulgated through the network and ultimately transmitted over the air interface via its serving base station 202. The measured fingerprint typically includes a number of parameters or RF characteristics of the UE 200 which are determined based on these UE measurements. For example, the measured fingerprint can contain one or more of the following parameters: (a) ground truth, e.g. longitude, latitude and height; (b) the cell IDs that are detected by the UE 201, in each grid point; (c) quantized signal strength measurements and SINR, with respect to multiple cells, performed by the UE 201, in each grid point; (d) quantized timing advance, in each grid point; (e) RSTD and uncertainty of the RSTD, with respect to multiple cells, performed by the UE, in each grid point; (f) uncertainty of the reference signal time and uncertainty of the RSTD, with respect to multiple cells, performed by the network and UE, in each grid point; (g) quantized interference strength levels for each cell measurement; (h) quantized channel delay spread information related to each cell measurement; (i) the number of cells that are hearable with certain fidelity; (h a list of cells that are best candidates for reference cell selection; (i) the RSTD measurement accuracy and thus what RSTD reporting resolution is appropriate; (j) the number of RSTD measurements that should be reported; (k) the RSTD measurement error (or TOA measurement error) characteristics for each cell TOA measurement, such as error probability distribution, or at-least information about some low order moments (giving information about mean, variance etc.).

It will be appreciated by those skilled in the art that any combination of the afore-mentioned parameters (or other parameters) can be used to define a positioning fingerprint depending upon, for example, the type of fingerprinting positioning technique which is employed to determine an initial location of the UE 200. For example, one variant of fingerprinting positioning is, e.g., described in the paper by T. Wigren, "Adaptive enhanced cell-ID fingerprinting positioning by clustering of precise position measurements", published in IEEE Trans. Vehicular Tech., vol. 56, no. 5, 2007, also referred to by its acronym "AECID". While this type of fingerprinting positioning can be used in conjunction with these embodiments, the present invention is not limited thereto.

Regardless of the specific type of fingerprinting positioning which is used, in response to signal 210, the UE 200 will make the measurements needed to generate the measured fingerprint for that particular fingerprinting method and return those measurements to the E-SMLC 208 via signal 211. This information can then be forwarded on to a positioning server in the radiocommunication system 200, e.g., AECID server 212 and its database 213 of reference fingerprints in this embodiment, via signal 214.

Figure 3A:
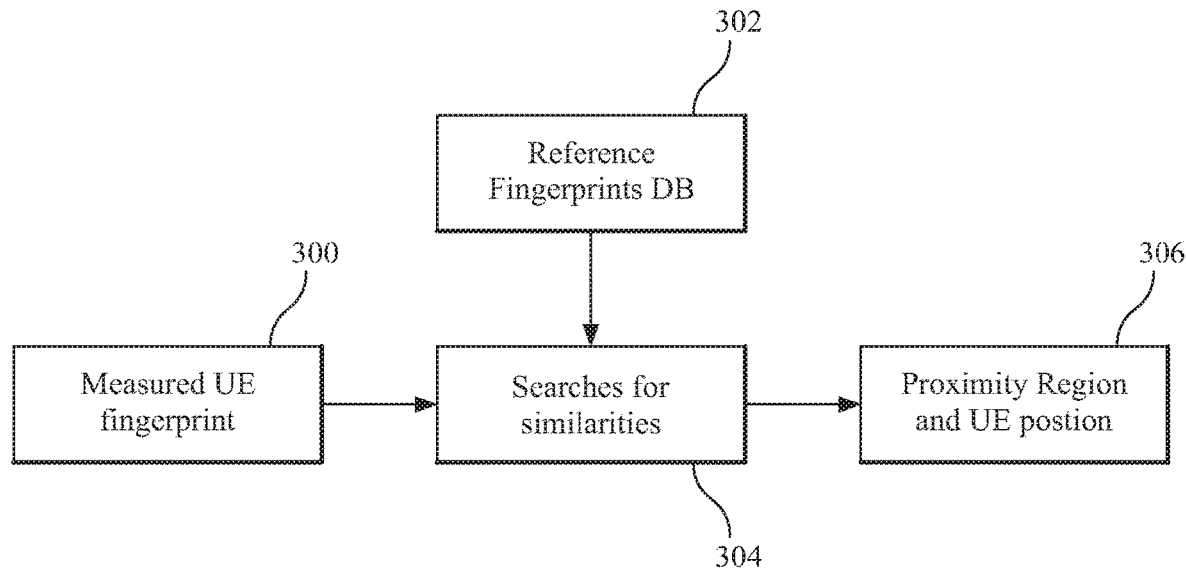
FIG. 3(a) illustrates a fingerprinting position technique.
Figure 3B:
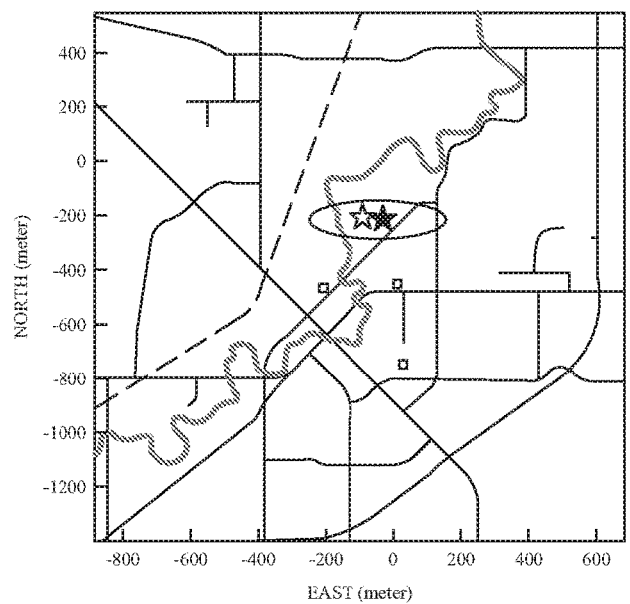
FIG. 3(b) graphically illustrates certain outputs of the fingerprinting position technique of FIG. 3(a)

The AECID server 212 can generally operate as shown in FIG. 3(a) to estimate the UE 200's position, as well as to generate a proximity region within which the UE 200 is located with a predetermined confidence level. For example, AECID 212 server will use the measured fingerprint 300 associated with UE 201 to search for similarities between the measured fingerprint 300 and other, reference fingerprints 302 stored in a database, as indicated by block 304. As outputs, the AECID server 212 can generate both an estimated position of the UE 201 and a proximity region within which the fingerprinting positioning technique indicates that the UE is located within a predetermined confidence level as shown by block 306. A graphical example of an estimated UE position and a proximity region associated with that UE generated using a fingerprinting positioning technique, as well as the actual UE position, is illustrated as FIG. 3(b).

The reference fingerprints stored in database 213 can be either static or dynamic or a function of relevant parameters such as time, weather, density of users, load in the network, etc. The reference fingerprints can also be developed or improved via machine learning algorithms. Generally speaking, there are three different methods which can be used to populate the database 213: (1) offline data collection, by using a test terminal to collect ground truth, signal strength, timing advance, RSTD and RSTD uncertainty measured by test terminal, (2) online data collection in a live network, e.g., after high accuracy positioning, such as A-GPS/A-GNSS positioning, the network node (i.e., the E-SMLC 208) requests measurements from the UE 200, such as signal strength, timing advance, RSTD and RSTD uncertainty, in order to map this data to the high accuracy position estimation, and/or (3) Minimization of Drive Testing (MDT), MDT procedures provide an easy and efficient way to gather huge reference fingerprints databases, since the MDT procedure allows collecting user experienced coverage and service quality related information associated with detailed location from GNSS receiver, see, e.g., 3GPP TR 36.805 and 3GPP TS 37.320.

Returning now to FIG. 2(b), in addition to providing the AECID server 212 with the UE 200's measurements in signal 214, the E-SMLC 208 can also indicate which fingerprinting parameters should be returned to the E-SMLC 208 after the fingerprinting positioning outputs have been generated. These fingerprinting parameters will be selected based upon the type of OTDOA assistance information that the E-SMLC 208 will be generating, as well as the method being used to generate that OTDOA assistance information. Specific examples are provided below. For example, according to one embodiment, the AECID server 212 can send to the E-SMLC 208 certain fingerprinting information associated with each of the reference fingerprints which are located within the determined proximity region for the UE 200 as signal 216.

Based on the fingerprinting information received in signal 216, the E-SMLC 208 can generate one or more elements of OTDOA assistance information. Specific examples of how the assistance information can be generated are provided below. This assistance information is then transmitted to the UE 200 via signal 218. The UE 200 then performs RSTD measurements on received transmissions from a plurality of eNodeBs as indicated by the OTDOA assistance data. The UE 200 may then either return the RSTD measurements themselves to the E-SLMC 208 via signal 220, whereupon the E-SLMC 208 can use the RSTD measurements to determine the UE 200's position using an OTDOA positioning technique (i.e., for UE-assisted embodiments) or, alternatively, the UE 200 can use the RSTD measurements to itself calculate its position using the OTDOA positioning technique (i.e., for UE-based embodiments) and can then transmit that position back to the E-SMLC 208 via signal 220. A third alternative is that the UE 200 can transmit both the RSTDs and its position back to the E-SLMC 208 via signal 220.

Figure 4:
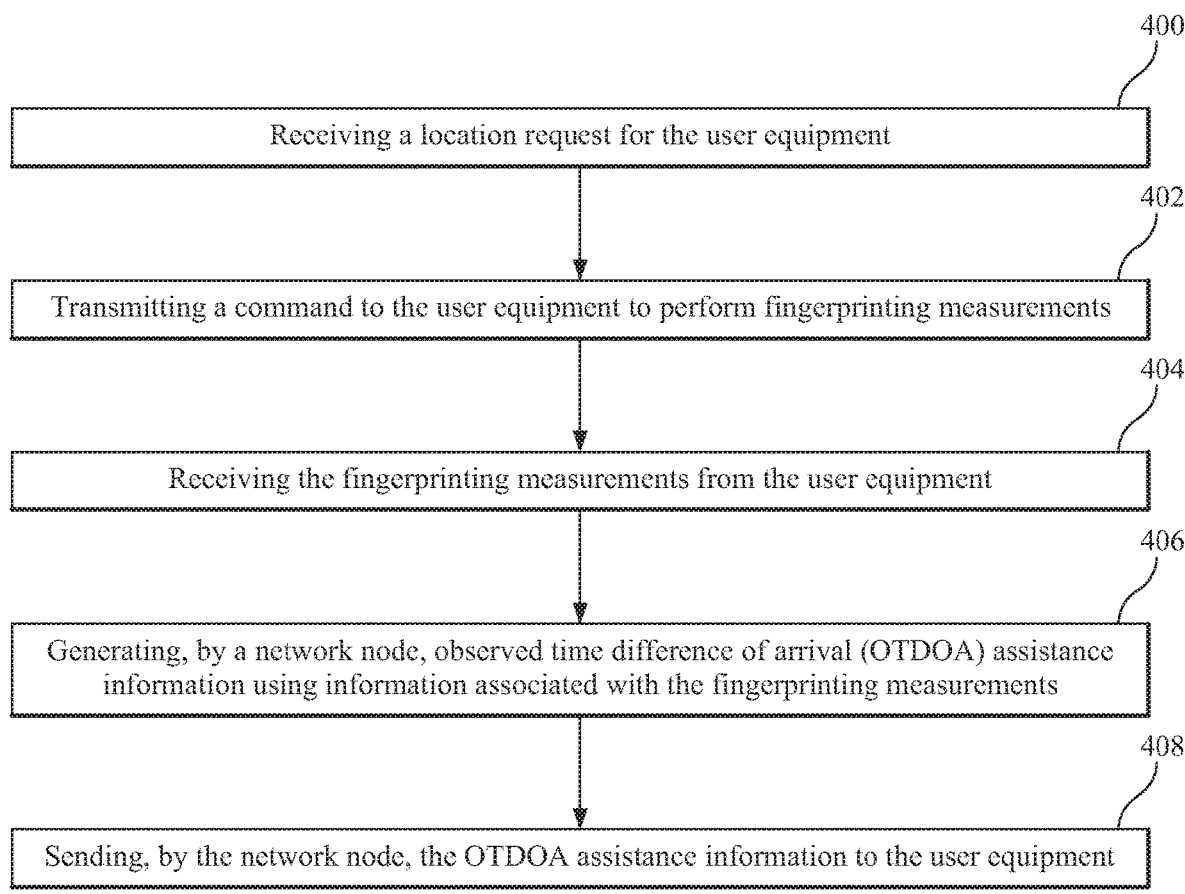
FIG. 4 is a method for assisting in performance of OTDOA positioning of a user equipment according to an embodiment.

Based on the foregoing, a method embodiment for hybrid fingerprinting/OTDOA positioning from the perspective of a network node, e.g., an E-SMLC, is illustrated in the flowchart of FIG. 4. Therein, at step 400, a location request is received for the user equipment, resulting in the transmission of a command to the user equipment to perform fingerprinting measurements at step 402. The fingerprinting measurements from the user equipment are received by the network node at step 404. The network node generates observed time difference of arrival (OTDOA) assistance information using information associated with the fingerprinting measurements at step 406, and sends the OTDOA assistance information to the user equipment at step 408.

The network node can receive: (a) reference signal time differences (RSTDs) generated by the user equipment based on measurements performed using the OTDOA assistance information, (b) a position of the user equipment if the user equipment itself performs the OTDOA calculations or (c) both the RSTDs and the position of the user equipment, i.e., the network node receives at least one of the RSTDs and the user equipment's position. Thus, depending upon the mode of positioning being used, the network node either receives the OTDOA determined position from the user equipment or itself determines the position of the user equipment using the received RSTDs.

Figure 5:
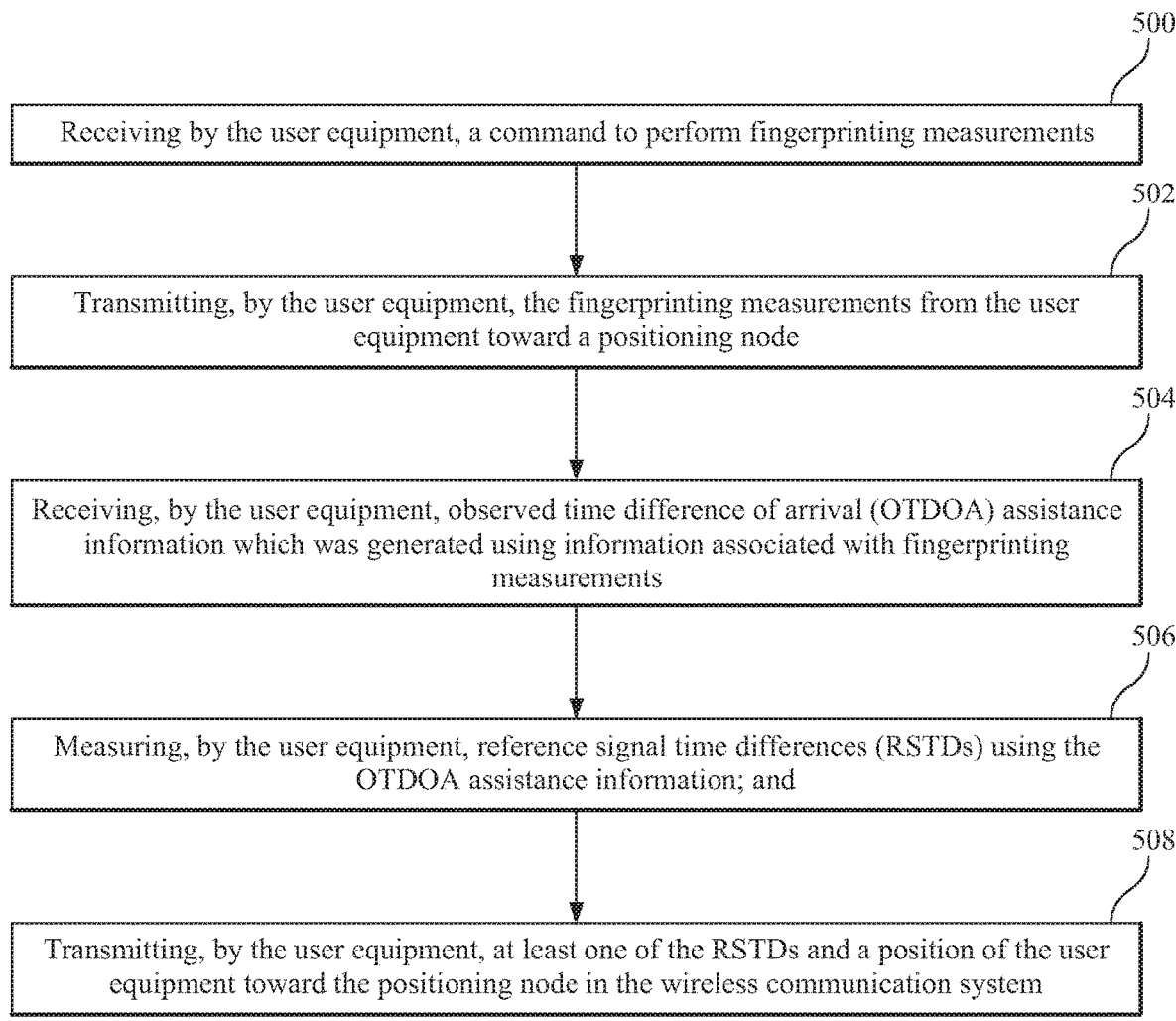
FIG. 5 is a method for assisting in performance of OTDOA positioning of a user equipment according to another embodiment.

Similarly, embodiments can be viewed from the UE perspective. FIG. 5 illustrates such a method embodiment. At step 500, the user equipment receives a command to perform fingerprinting measurements. After performing these measurements, the fingerprinting measurements are transmitted from the user equipment toward a positioning node as indicated by step 502. The user equipment subsequently receives observed time difference of arrival (OTDOA) assistance information which was generated using information associated with the fingerprinting measurements at step 504. Using the OTDOA assistance information, the UE measures reference signal time differences (RSTDs) (step 506) and transmits at least one of the RSTDs and a position of the user equipment toward the positioning node in the wireless communication system as indicated by step 508. Thus, as mentioned above with respect to the network node's receipt of information from the user equipment, according to the embodiment of FIG. 5, the user equipment can transmit: (a) just the RSTDs, (b) just its position or (c) both the RSTDs and its position, i.e., at least one of the RSTDs and the position.

Having described some general embodiments of hybrid OTDOA/fingerprinting positioning with respect to FIGS. 2(b), 4 and 5, the discussion now turns to some examples of how fingerprinting positioning information can be used to generate specific OTDOA assistance information. As a first example, consider that the selection/identification of which cells shall be the neighbor cells and which cell shall be the reference cell for purposes of taking measurements and calculating RSTD values is some or all of the OTDOA assistance information to be generated using information made available from generating the UE's fingerprint position. One way to identify/select cells as the reference cell and the neighbor cells based on fingerprinting information is as follows.

Figure 6:
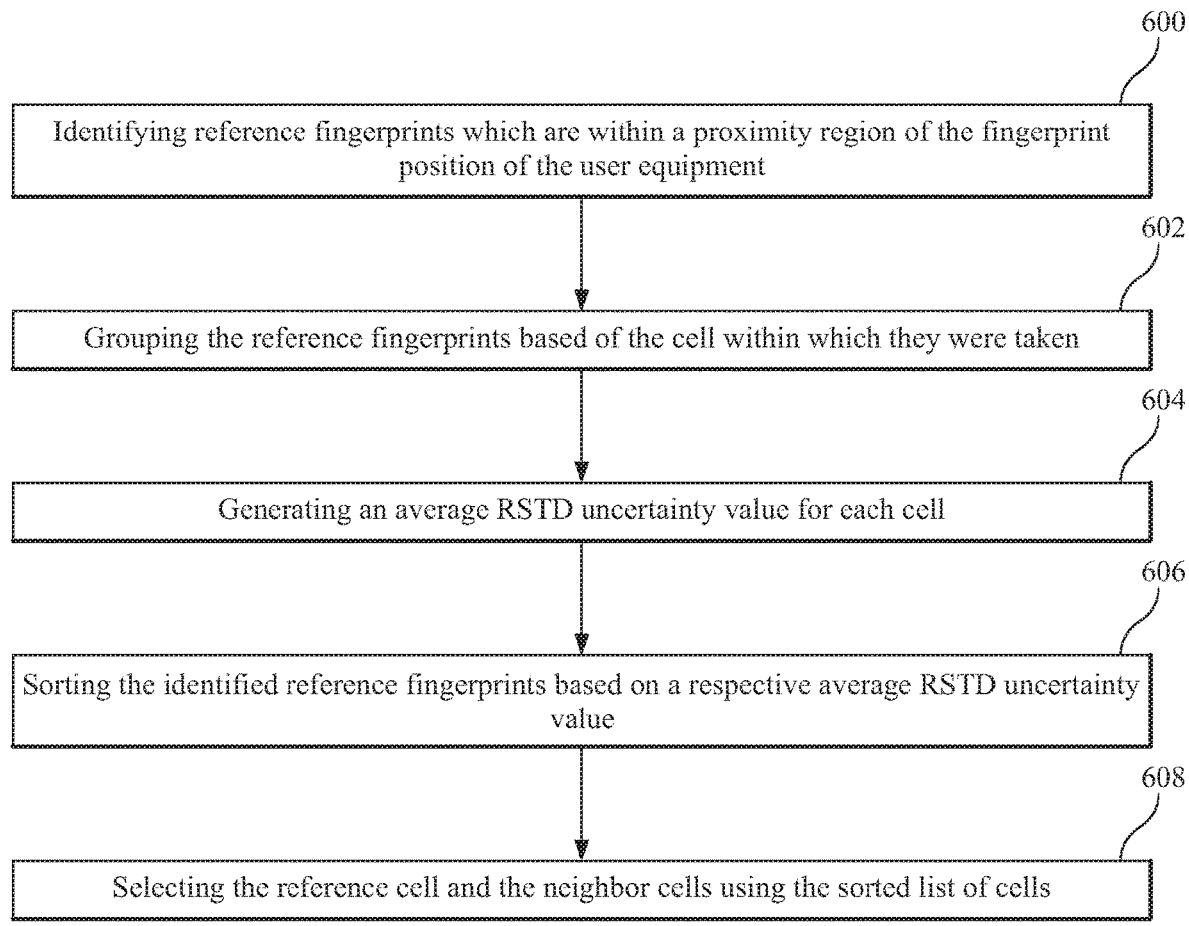
FIG. 6 is a flowchart illustrating selection of reference and neighbor cells for assistance information based on fingerprinting information according to an embodiment.

Assuming that the fingerprinting positioning technique that was used by the system returned, among other information, RSTD uncertainty values (i.e., values which indicate the accuracy range of the TOA measurements made by the UE), then the method illustrated in FIG. 6 can be used to select the reference and neighbor cells. The system can, at step 600, identify the reference fingerprints which are with the proximity range of the fingerprint position of the UE. For example, those reference fingerprints which are stored in database 213 and which are within the proximity range can be sent to the E-SMLC 208 from the positioning server 212 via signal 216.

These reference fingerprints can be grouped by the cell within which they were generated at step 602, and then an average RSTD uncertainty value can be generated for each cell at step 604. If the grouping step 602 results in too few cells being identified, e.g., not as many cells as needed to specify a reference cell and the required number of neighbor cells, then the proximity range can be expanded and the process can begin again at step 600.

Otherwise, the cells can be sorted, as shown in step 606, based on their respective average RSTD uncertainty values, e.g., from the cell having the lowest average RSTD uncertainty to the cell having the greatest average RSTD uncertainty. Then, at step 608, the sorted list can be used to select the reference cell and the neighbor cells to be identified to the UE as the OTDOA assistance information. For example, the reference cell could be selected to be the cell having the lowest average RSTD uncertainty value, and the neighbor cells can be the next N number of cells in the list, where N is the number of neighbor cells to be identified to the UE based on the particular OTDOA positioning technique being employed. Alternatively, the reference cell can be selected as the cell which is currently serving the UE whose position is being determined and the neighbor cells can be selected as the N cells having the lowest average RSTD uncertainty values. The E-SMLC 208 can then send the identified reference cell and neighbor cell information to the UE 200 as the OTDOA assistance information.

In some cases, the RSTD uncertainty values are not directly present in the stored parameters associated with the reference fingerprints. In these cases, the methodology of FIG. 6 can still be used to identify reference and neighbor cells for use in providing OTDOA assistance information, but the RSTD uncertainty values first have to be estimated using other data which is present in the reference fingerprints. Briefly, and for example, using the reference fingerprints in the proximity regions, either the PRS or CRS signal strength of each corresponding cell can be determined. Also, the noise and interference for each cell can also be estimated using, e.g., the serving cell's CRS RSRP and RSRQ. With the PRS or CRS signal strength and noise and interference determined, the signal to interference and noise ratio (SINR) can then be calculated for either the PRS or the CRS signals in each cell. The PRS SINR and the CRS SINR are related to the RSTD uncertainty, which relationship can be calculated via simulation as will be appreciated by those skilled in the art, and thus used to estimate the RSTD uncertainty for each cell. The estimated RSTD uncertainty for each cell can then be used as described above with respect to FIG. 6 to identify the reference cell and neighbor cells to be included in the OTDOA assistance information.

Although the foregoing examples refer specifically to the identification of reference and neighbor cells as the specific type of assistance information being generated, there are many different types of OTDOA assistance data which can be generated by the E-SMLC 206 and sent to the UE 200 to improve the accuracy of its RSTD measurements, many of which can be improved according to these embodiments by using information derived from fingerprinting positioning. For example any one or more of the following types of assistance data can be generated using fingerprinting information: RSTD reporting resolution, TOA error variance, resources which suffer interference greater than a predetermined threshold, an identification of a TOA algorithm to be used by the user equipment; a propagation model, an expected channel delay value, an indication of whether the user equipment is classified as being either indoor or outdoor, and whether the user equipment should use elevation beamforming.

Another example of assistance information which can be generated using fingerprinting information according to an embodiment is the receiver setting used in the UE in PRS timing estimations. For example, when making measurements, most UEs use a threshold-based receiver which consider the first peak in a received signal having an amplitude which is higher than some threshold on the channel impulse response of a cell as point at which PRS timing is estimated. By providing UE with a suggested threshold value as an assistance data it is again possible to improve the RSTD measurements. The value of the threshold can be varied to balance the tradeoff between loss of signal (LOS) detection and robustness against interference and noise, and therefore the optimum threshold value differs for each cell to UE link. Signal strength measurements, with respect to multiple cells, performed by the UE in each grid point is a fingerprinting parameter which can assist embodiments in setting a proper threshold for each UE's RSTD measurement. For example, in poor channel conditions with low SINR values, it is generally preferred to have a high threshold to avoid picking a noise peak in the channel impulse response, while in a strong channel conditions with high SINR values, a lower threshold results in taking the first peak and having a more precise time estimation.

The embodiments can provide various advantages. For example, by using a hybrid positioning method including fingerprinting and OTDOA, the overall UE position estimation is expected to be significantly improved compared to the case when one of these methods is individually used. Additionally, the information output from fingerprinting provides an enhanced ability to the location server to provide more accurate OTDOA assistance information to the UE. Moreover, the hybrid position estimation from both methods gives proper feedback to the location server on the amount of uncertainty for the determined position estimation.

Figure 7A:
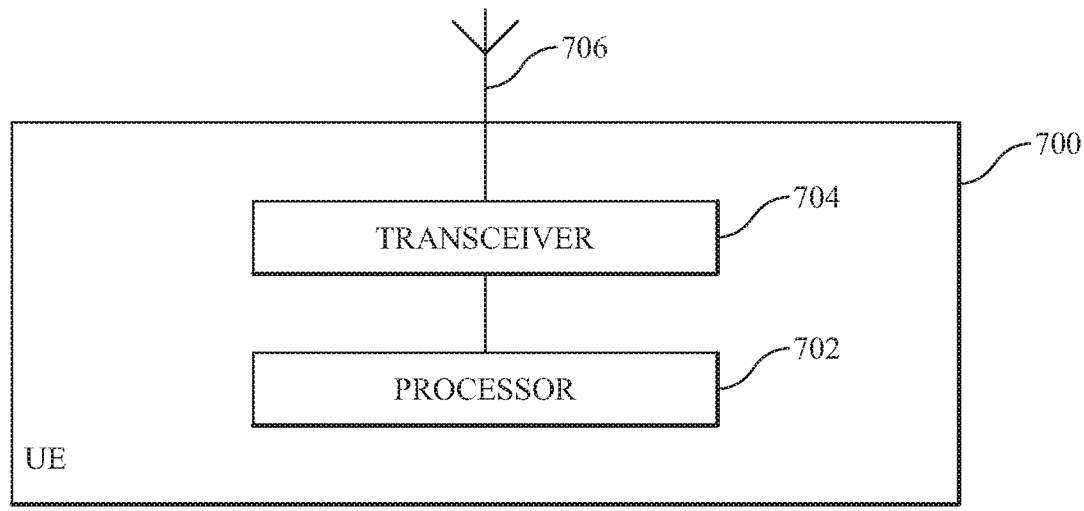
FIG. 7(a) is a user equipment.
Figure 7B:
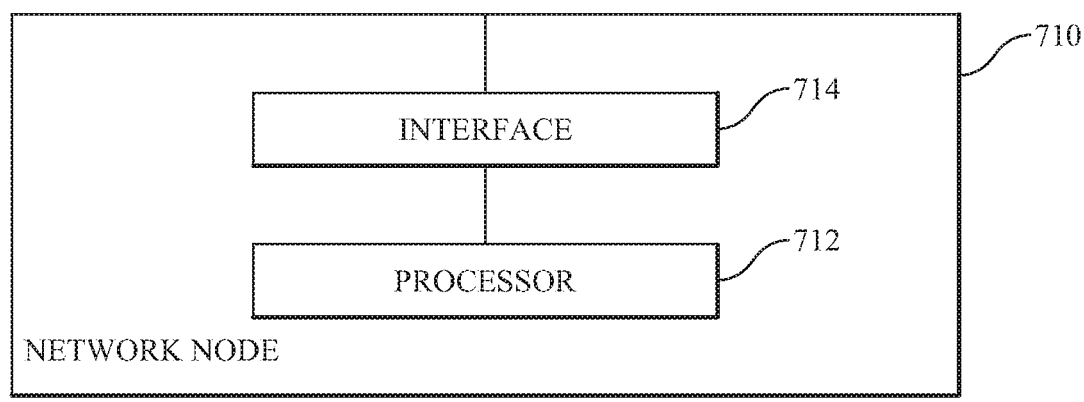
FIG. 7(b) is a network node.

Additionally, in some embodiments the non-limiting term user equipment (UE) is used and it refers to any type of wireless device communicating with a network node in a cellular or mobile communication system over radio interface. Examples of UEs are target devices, device to device (D2D) UEs, proximity-based service (ProSe) UEs, machine type UEs or UEs capable of machine to machine communication (aka category 0 UEs, low cost and/or low complexity UEs), PDAs, iPADs, tablets, mobile terminals, smart phones, laptop embedded equipment (LEE), laptop mounted equipment (LME), USB dongles, wireless devices etc. An example of a UE 700 is illustrated in FIG. 7(*a*) including a processor 702, radio transceiver 704, and antenna 706 which can cooperate to, for example, perform the method of FIG. 5.

Various embodiments described herein refer to nodes. In some embodiments the non-limiting network node (also interchangeably called as node) is more commonly used and it refers to any type of network node which directly or indirectly communicates with the UE. It can be radio network node or a node in a core network or fixed part of the network. For example it can be a network node serving the UE, a network node neighboring to the serving network node of the UE, any network node in the radio network or in the core network in wireless communication system in which UE operates. Examples of network nodes are base stations (BS), multi-standard radio (MSR) radio nodes such as MSR BS, eNode B (eNB), network controllers, radio network controllers, base station controllers, relay, donor node controlling relays, base transceiver stations (BTS), access points (AP), core network nodes (e.g. MSC, MME etc), O&M, OSS, SON, location server (e.g. E-SMLC), MDT etc. An example of a network node 710 is illustrated in FIG. 7(*b*) including a processor 712 and an interface 714, e.g., one of the interfaces illustrated in FIG. 2(a), which network node 710 can, for example, be configured to perform the method of FIG. 4.

Figure 8:
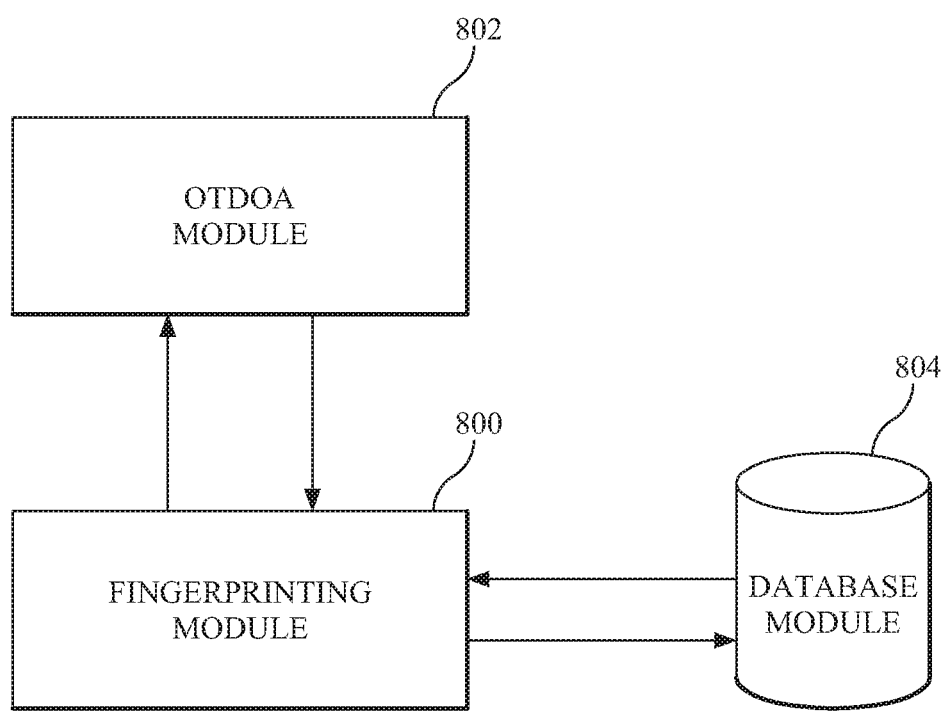
FIG. 8 depicts software modules according to an embodiment.

Embodiments can also be expressed in terms of software modules or components as generally illustrated in FIG. 8. Therein a fingerprinting module 800 provides the algorithms and techniques needed to perform the fingerprinting positioning, and it interacts with a database module 802 for storing fingerprints and their associated parameters. The fingerprinting module 800 also interacts with the OTDOA positioning module 804 to provide fingerprinting information used to generate assistance information as described above.

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000 etc.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for assisting in performance of an observed time difference of arrival (OTDOA) positioning technique in a wireless communication system, the method comprising:
   receiving, by the user equipment, a command to perform fingerprinting measurements;
   transmitting, by the user equipment, the fingerprinting measurements from the user equipment toward a positioning node;
   receiving, by the user equipment, OTDOA assistance information which was generated using information associated with the fingerprinting measurements;
   measuring, by the user equipment, reference signal time differences (RSTDs) using the OTDOA assistance information; and
   transmitting, by the user equipment, at least one of the RSTDs and a position of the user equipment toward the positioning node in the wireless communication system.

2. The method of claim 1, wherein the OTDOA assistance information includes an identification of a reference cell and a plurality of neighbor cells to be used in generating the RSTDs.

3. The method of claim 1, wherein the OTDOA assistance information includes one or more of: RSTD reporting resolution, TOA error variance, resources which suffer interference greater than a predetermined threshold, an identification of a TOA algorithm to be used by the user equipment; a propagation model, an expected channel delay value, an indication of whether the user equipment is classified as being indoor or outdoor, and whether the user equipment should use elevation beamforming.

4. The method of claim 1, further comprising:
   using, by the user equipment, the RSTDs and an OTDOA positioning technique to determine the user equipment's position; and
   transmitting, by the user equipment, the user equipment's position toward the positioning node.

5. The method of claim 1, wherein the information associated with the fingerprinting measurements includes at least one of: a fingerprinting position of the user equipment determined using the fingerprinting measurements and a proximity region associated with the fingerprinting position.

6. A user equipment comprising:
   a processor configured to receive a command to perform fingerprinting measurements usable to generate the one or more fingerprinting parameters; and
   a transceiver configured to transmit the fingerprinting measurements from the user equipment toward a positioning node;
   wherein the transceiver is further configured to receive observed time difference of arrival (OTDOA) assistance information which was generated using information associated with the fingerprinting measurements;
   wherein the processor is further configured to measure reference signal time differences (RSTDs) using the OTDOA assistance information; and
   wherein the transceiver is further configured to transmit at least one of a position of the user equipment and the RSTDs toward the positioning node in the wireless communication system.

7. The user equipment of claim 6, wherein the OTDOA assistance information includes an identification of a reference cell and a plurality of neighbor cells to be used in generating the RSTDs.

8. The user equipment of claim 6, wherein the OTDOA assistance information includes one or more of: RSTD reporting resolution, TOA error variance, resources which suffer interference greater than a predetermined threshold, an identification of a TOA algorithm to be used by the user equipment; a propagation model, an expected channel delay value, an indication of whether the user equipment is classified as being indoor or outdoor, and whether the user equipment should use elevation beamforming.

9. The user equipment of claim 6, wherein:
   the processor is further configured to use the RSTDs and an OTDOA positioning technique to determine the user equipment's position; and
   the transceiver is further configured to transmit the user equipment's position toward the positioning node.

10. The user equipment of claim 6, wherein the information associated with the fingerprinting measurements includes at least one of: a fingerprinting position of the user equipment determined using the fingerprinting measurements and a proximity region associated with the fingerprinting position.

* * * * *